(12) United States Patent
Shibata et al.

(10) Patent No.: US 12,731,079 B2
(45) Date of Patent: Sep. 8, 2026

(54) LEARNING APPARATUS, IDENTIFICATION APPARATUS, LEARNING METHOD, IDENTIFICATION METHOD, AND COMPUTER PROGRAM

(71) Applicant: NTT, Inc., Tokyo (JP)

(72) Inventors: Takashi Shibata, Musashino (JP); Go Irie, Musashino (JP); Daiki Ikami, Musashino (JP); Yu Mitsuzumi, Musashino (JP)

(73) Assignee: NTT, Inc., Tokyo (JP)

( * ) Notice: Subject to any disclaimer, the term of this patent is extended or adjusted under 35 U.S.C. 154(b) by 507 days.

(21) Appl. No.: 18/283,032

(22) PCT Filed: Mar. 23, 2021

(86) PCT No.: PCT/JP2021/011949

§ 371 (c)(1),
(2) Date: Sep. 20, 2023

(87) PCT Pub. No.: WO2022/201296

PCT Pub. Date: Sep. 29, 2022

(65) Prior Publication Data

US 2024/0169262 A1 May 23, 2024

(51) Int. Cl.
*G06N 20/00* (2019.01)

(52) U.S. Cl.
CPC .................................... *G06N 20/00* (2019.01)

(58) Field of Classification Search
None
See application file for complete search history.

(56) References Cited

U.S. PATENT DOCUMENTS

2021/0073641 A1* 3/2021 Tanizawa ............. G06N 3/0495
2022/0051133 A1* 2/2022 Jacobs .................. G06F 18/214

OTHER PUBLICATIONS

Sylvestre-Alvise Rebuffi et al., "iCaRL: Incremental Classifier and Representation Learning", In Proc. CVPR, 2017.
Arun Mallya et al., "PackNet: Adding Multiple Tasks to a Single Network by Iterative Pruning", In Proc. CVPR, 2018.
Zhizhong Li et al., "Learning without Forgetting", TPAMI, 40(12): 2935-2947, 2017.
K. He et al., "Deep Residual Learning for Image Recognition", In Proc. CVPR, 2016.
James Kirkpatrick et al., "Overcoming catastrophic forgetting in neural networks", PNAS, 114(13): 3521-3526, 2017.
Rahaf Aljundi et al., "Memory Aware Synapses: Learning what (not) to forget", ECCV, pp. 139-154, 2018.

* cited by examiner

*Primary Examiner* — Richard L Bowen
(74) *Attorney, Agent, or Firm* — Harness, Dickey & Pierce, P.L.C.

(57) ABSTRACT

A learning device includes: a data input unit configured to receive first data which is a learning target, second data for identifying the first data, and second past data that is used as data for identifying the first data during past learning and relates to learning content to be preserved; a combined data generation unit configured to generate combined data by combining the first data and the second data; and a parameter updating unit configured to update a parameter of a machine learning model based on features of the second past data and the combined data obtained by inputting the combined data and the second past data to the machine learning model.

6 Claims, 6 Drawing Sheets

1
LEARNING DEVICE
11
INPUT UNIT
111
DATA INPUT UNIT
112
PSEUDO-DATA INPUT UNIT
113
PSEUDO-DATA REINPUT UNIT
13
COMMUNICATION UNIT
12
CONTROL UNIT
121
EXTENDED DATA GENERATION UNIT
122
FEATURE EXTRACTION UNIT
123
IDENTIFICATION UNIT
124
LOSS ACQUISITION UNIT
125
PARAMETER UPDATING UNIT
126
END DETERMINATION UNIT
14
STORAGE UNIT
15
OUTPUT UNIT

FIG. 2

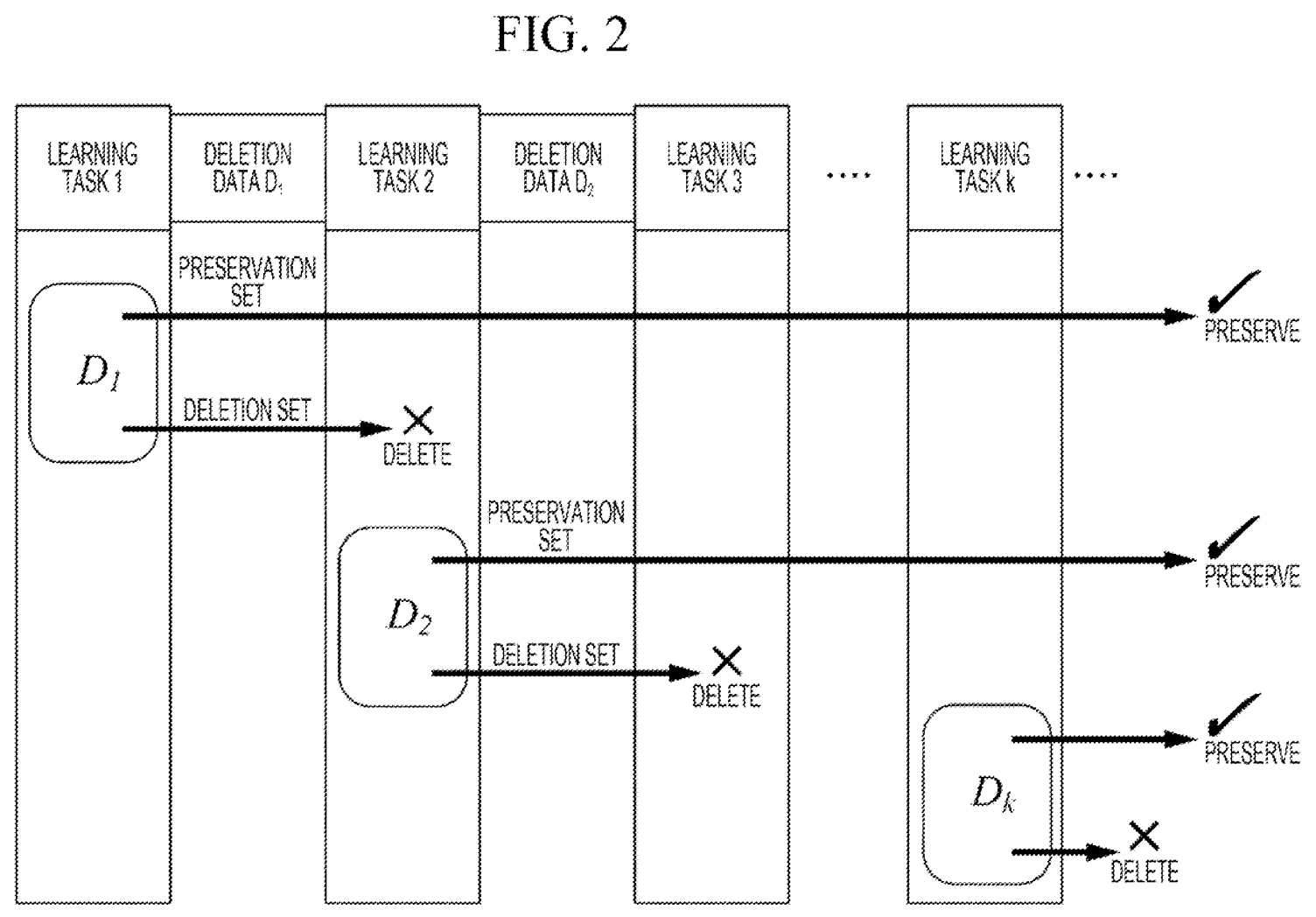

LEARNING TASK 1
DELETION DATA $D_1$
LEARNING TASK 2
DELETION DATA $D_2$
LEARNING TASK 3
LEARNING TASK k
$D_1$
$D_2$
$D_k$
PRESERVATION SET
DELETION SET
PRESERVATION SET
DELETION SET
DELETE
DELETE
DELETE
PRESERVE
PRESERVE
PRESERVE

FIG. 3

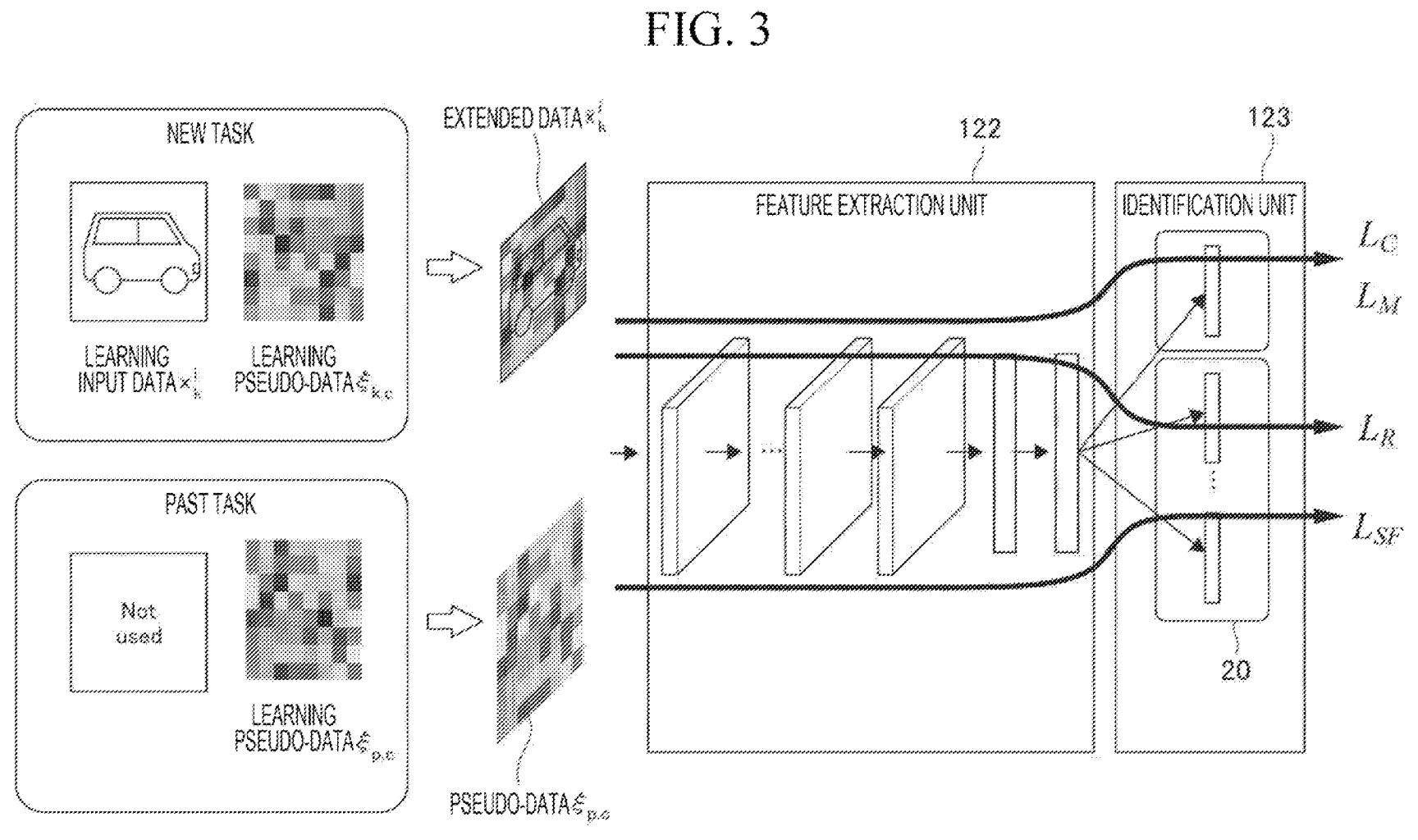

NEW TASK
LEARNING INPUT DATA $x^i_k$
LEARNING PSEUDO-DATA $\xi_{k,c}$
PAST TASK
Not used
LEARNING PSEUDO-DATA $\xi_{p,c}$
EXTENDED DATA $x^i_k$
PSEUDO-DATA $\xi_{p,c}$
122
FEATURE EXTRACTION UNIT
123
IDENTIFICATION UNIT
20
$L_G$
$L_M$
$L_R$
$L_{SF}$

LEARNING APPARATUS, IDENTIFICATION APPARATUS, LEARNING METHOD, IDENTIFICATION METHOD, AND COMPUTER PROGRAM

CROSS-REFERENCE TO RELATED APPLICATIONS

This application is a 371 U.S. National Phase of International Application No. PCT/JP2021/011949, filed on Mar. 23, 2021. The entire disclosure of the above application is incorporated herein by reference.

TECHNICAL FIELD

The present invention relates to a learning device, an identification device, a learning method, an identification method, and a computer program.

BACKGROUND ART

In deep learning of machine learning, when networks are updated for new learning, performance of previous learning content (hereinafter referred to as "tasks") dramatically deteriorates. In order to reduce this influence, research on lifelong learning for the purpose of updating a network to make adaptation to new tasks without forgetting past learning results has actively been carried out. Specific examples of the new tasks include new classes and a collection of new instances.

Examples of the research on lifelong learning include the contents disclosed in Non Patent Literatures 1 to 3. For example, Non Patent Literature 1 discloses a method called a memory reproduction base that stores some past learning samples and reproduces the past learning samples at the time of new tasks. Non Patent Literature 2 discloses a method of freezing model parameters in deep learning. Non Patent Literature 3 also discloses a method of implicitly utilizing knowledge of previous tasks by introducing an additional regularization term.

CITATION LIST

Non Patent Literature

Non Patent Literature 1: Sylvestre-Alvise Rebuffi, Alexander Kolesnikov, Georg Sperl, and Christoph H Lampert. "iCaRL: Incremental Classifier and Representation Learning", In Proc. CVPR, 2017.

Non Patent Literature 2: Arun Mallya and Svetlana Lazebnik, "PackNet: Adding Multiple Tasks to a Single Network by Iterative Pruning", In Proc. CVPR, 2018.

Non Patent Literature 3: Zhizhong Li and Derek Hoiem. "Learning without Forgetting", TPAMI, 40(12):2935-2947, 2017.

SUMMARY OF INVENTION

Technical Problem

Most of the above-described existing lifelong learning is designed to learn a highly expressive model for a new task while preserving all previous task knowledge. On the other hand, artificial intelligence is currently facing a new type of problem. As artificial intelligence becomes more practical and connected to daily life, various ethical problems such as privacy protection and data leakage prevention are becoming important issues. These problems cannot be avoided in technologies in lifelong learning either.

Keeping full knowledge of all previous tasks can result in risks of data leakage and privacy infringement. Further, it is not always necessary to have full knowledge of previous tasks. For example, on the assumption that a face authentication system is installed at an entrance of an office, it is not always necessary to store the face of a person transferring to another department. Therefore, it is preferable to perform learning in which unnecessary knowledge among past tasks is selectively forgotten and other knowledge can be stored.

In view of the foregoing circumstances, an objective of the present invention is to provide a technology capable of performing learning in which unnecessary learning content among past learning content is selectively forgotten and other learning content can be stored.

Solution to Problem

One aspect of the present invention is a learning device including: a data input unit configured to receive first data which is a learning target, second data for identifying the first data, and second past data that is used as data for identifying the first data during past learning and relates to learning content to be preserved; a combined data generation unit configured to generate combined data by combining the first data and the second data; and a parameter updating unit configured to update a parameter of a machine learning model based on features of the second past data and the combined data obtained by inputting the combined data and the second past data to the machine learning model.

Another aspect of the present invention is an identification device that identifies input data using a learned model obtained by the foregoing learning device.

Still another aspect of the present invention is a learning method including: receiving first data which is a learning target, second data for identifying the first data, and second past data that is used as data for identifying the first data during past learning and relates to learning content to be preserved; generating combined data by combining the first data and the second data; and updating a parameter of a machine learning model based on features of the second past data and the combined data obtained by inputting the combined data and the second past data to the machine learning model.

Still another aspect of the present invention is an identification method of identifying input data using a learned model obtained by the foregoing learning device.

Still another aspect of the present invention is a computer program including: receiving first data which is a learning target, second data for identifying the first data, and second past data that is used as data for identifying the first data during past learning and relates to learning content to be preserved; generating combined data by combining the first data and the second data; and updating a parameter of a machine learning model based on features of the second past data and the combined data obtained by inputting the combined data and the second past data to the machine learning model.

Still another aspect of the present invention is a computer program causing a computer to function as the identification device.

Advantageous Effects of Invention

According to the present invention, it is possible to perform learning in which unnecessary learning content among past learning content is selectively forgotten and other learning content can be stored.

BRIEF DESCRIPTION OF DRAWINGS

FIG. 2 is a diagram illustrating an object of the present invention.

FIG. 3 is a diagram schematically illustrating a process in the embodiment.

DESCRIPTION OF EMBODIMENTS

Hereinafter, an embodiment of the present invention will be described in detail with reference to drawings.

Figure 1:
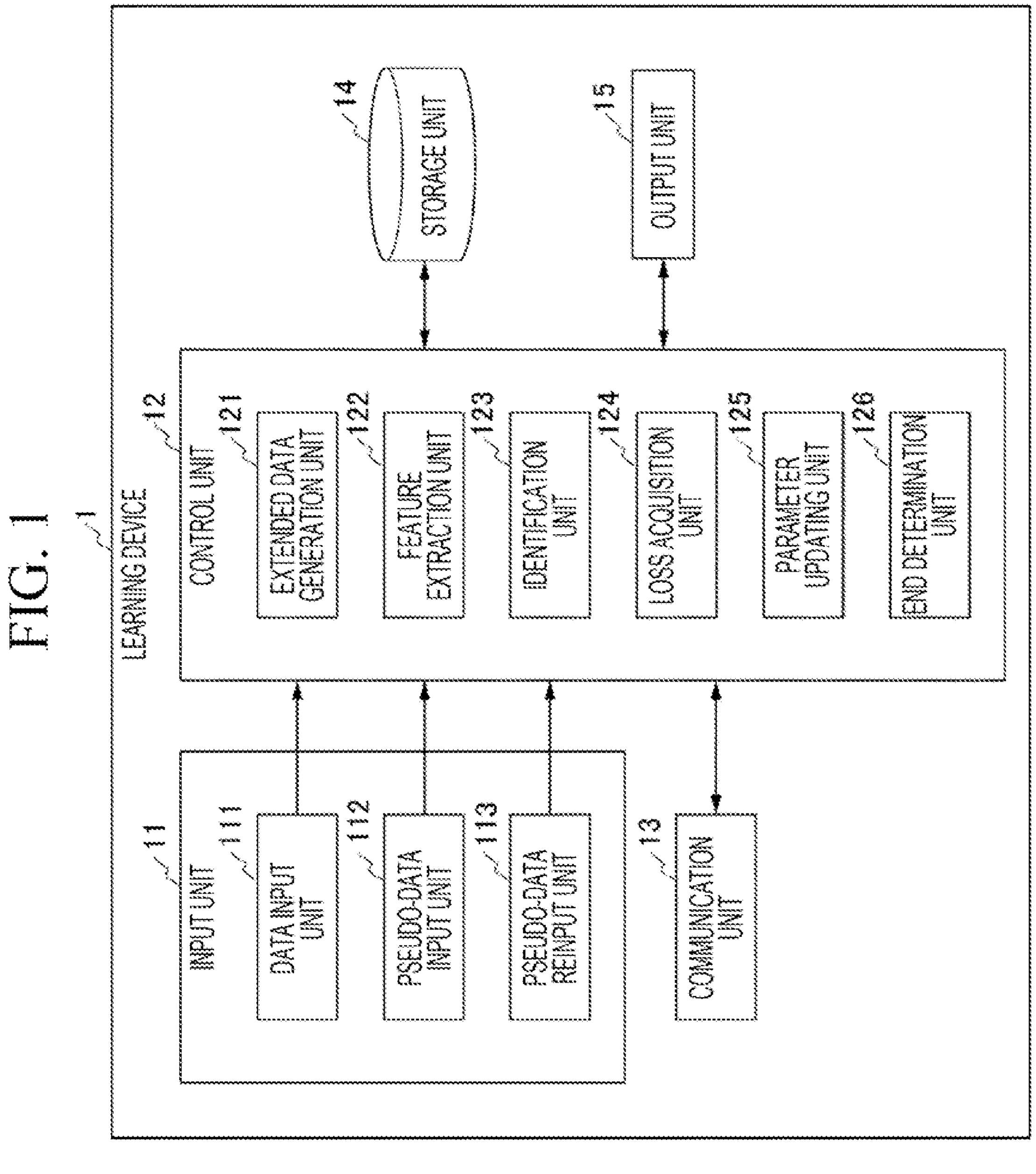
FIG. 1 is a block diagram illustrating a functional configuration of a learning device according to an embodiment.

FIG. 1 is a block diagram illustrating a functional configuration of a learning device 1 according to the embodiment. The learning device 1 according to the embodiment is a device that performs so-called lifelong learning that enables continuous learning. The learning device 1 updates a model of predetermined machine learning by machine learning until a predetermined end condition is satisfied.

The model of the predetermined machine learning at a time at which the predetermined end condition is satisfied is a learned model. Therefore, the learning device 1 acquires the learned model by updating the model of the predetermined machine learning by machine learning until the predetermined end condition is satisfied.

Hereinafter, to facilitate description, performing machine learning is also referred to as learning. Updating a model of machine learning (hereinafter referred to as a "machine learning model") by machine learning means appropriately adjusting values of parameters in the machine learning model. In the following description, learning so that A is satisfied means that values of parameters in a machine learning model are adjusted to satisfy A. A indicates a condition. Hereinafter, "for learning" means to be used for updating the machine learning model. The machine learning model is a set including one process or a plurality of processes in which a condition and an order to be executed are determined in advance.

The machine learning model is represented by, for example, a neural network. The neural network is a circuit such as an electronic circuit, an electrical circuit, an optical circuit, or an integrated circuit and is a circuit representing a machine learning model. A parameter of the neural network is suitably adjusted on the basis of the loss, and the parameter of the network is a parameter of the machine learning model to be represented. The parameter of the network is a parameter of a circuit constituting the network.

The machine learning model updated by the learning device 1 is a model of machine learning for identifying input data. The learned model obtained by the learning device 1 by updating the parameter is, for example, a model that performs data classification. The learning input data, the learning reference data, and the learning pseudo-data are input to the machine learning model.

The learning input data is data which is a learning target. For example, the learning input data may be 2-dimensional or more data such as an image, may be 1-dimensional time-series data such as voice, sound, or vibration, or may be symbol data such as natural language. In this way, the learning input data may be any data generally applied to machine learning. When 1-dimensional time-series data such as voice, sound, or vibration is used as the learning input data, the 1-dimensional time-series data may be made 2-dimensional using a cepstrum or the like.

The learning reference data is so-called correct data in machine learning. The learning reference data may be obtained by quantifying information corresponding to a class label such as an attribute, a class name, or a person ID, or may be data similar to the learning input data, that is, image or voice data. The learning reference data may be any objective variable that is generally applied to machine learning. More specifically, when a label is used as an objective variable, a purpose is identification or authentication. When data similar to the learning input data is used as a variable, regression is the purpose.

Hereinafter, data including a pair of at least one piece of learning input data and one piece of learning reference data is referred to as learning data. That is, the learning data is data including at least a set of the learning input data and the learning reference data and is an example of so-called learning data. The learning data is one type of first data.

The learning pseudo-data is data different from the learning data. For example, the learning pseudo-data may be data of a random noise pattern, data of a pattern in which a part of the learning input data deteriorates, or data of a pattern represented by an average value of the learning input data. The pattern represented by the average value of the learning input data may be a pattern in which each pixel is represented by the average value of each pixel in a plurality of pieces of learning input data or may be a pattern in which the average value of each pixel of one piece of learning input data is assigned to each pixel. As the learning pseudo-data, a small number of samples of which safety is guaranteed from the viewpoint of privacy or the like among data of past tasks may be used or a combined image generated by a generation model obtained by adversarial learning or the like may be used. The learning pseudo-data is data for identifying a class to which the learning data belongs.

In the present specification, an example in which image data is mainly handled as data input to the learning device 1 has been described, but the present invention is not limited thereto. In the present specification, a case where deep learning is used will be described.

In the following description, to clarify description, a set of input data is expressed as in Expression (1).

[Math. 1]

$$\{D_1, \ldots D_k, \ldots D_K\} \quad \text{Expression (1)}$$

For example, each data set $D_k$ is expressed as in the following Expression (2) using learning input data $x_k$ and learning reference data $y_k$. Here, $x^i_k$ is learning input data. $y^i_k$ is learning reference data.

[Math. 2]

$$D_k = \{(x_k^i, y_k^i)_{i=1}^N\} \quad \text{Expression (2)}$$

As described above, an objective of the present invention is to learn to selectively forget unnecessary knowledge (in this case, classes) among past tasks and store other knowledge (in this case, classes). In the following description, a class to be preserved (hereinafter referred to as a "preservation set") is represented as $C^p_k$. In this case, the selectively forgotten class (hereinafter referred to as a "deletion set".) becomes a complementary set of $C^p_k$., that is, $-C^p_k$ (where – is above C).

A network in the learning device 1 is represented by f and a parameter is formally represented by θ. That is, the network is represented as $f_\theta$.

The objective of the present invention can be expressed as follows using the above notation. When a class y which is correct belongs to a preservation class $C^p$, the input learning input data x is mapped to the correct class y. Conversely, when the class y which is correct does not belong to the preservation class $C^p$, $f_\theta$ in which the input learning input data x is mapped to a class other than the correct class y is learned.

In achieving the foregoing objective, the learning device 1 may provide the following constraint conditions.

(Constraint Conditions)

Past learning input data $\{D_1, \ldots, D_{k-1}\}$ is not used when a k-th task is learned.

Formally, such an objective can be described as in FIG. 2. FIG. 2 is a diagram illustrating the objective of the present invention. In the following description, a case where the above-described constraint condition is applied will be described, but the present invention is also applicable to a case where the above-described constraint condition is not given.

(Specific Configuration of Learning Device 1)

The learning device 1 includes an input unit 11, a control unit 12, a communication unit 13, a storage unit 14, and an output unit 15.

The input unit 11 includes a data input unit (data inputter) 111, a pseudo-data input unit 112, and a pseudo-data reinput unit 113.

In the k-th task, the data input unit 111 inputs the data set $D_k$ expressed in the foregoing Expression (2). That is, the data input unit 111 inputs a set of learning input data $x^i_k$ and the learning reference data $y^i_k$ in the k-th task.

The pseudo-data input unit 112 inputs the learning pseudo-data. Hereinafter, the set of learning pseudo-data is expressed as $\{\zeta_{k,c}\}$. Here, $\zeta_{k,c}$ is c-th class learning pseudo-data in the k-th task. The learning pseudo-data input to the pseudo-data input unit 112 is one type of second data.

The pseudo-data reinput unit 113 reinputs the learning pseudo-data input by the pseudo-data input unit 112. More specifically, the pseudo-data reinput unit 113 may input the learning pseudo-data of $\{\zeta_{k',c}\}$ (where k'<k) in the k-th task. That is, the pseudo-data reinput unit 113 inputs the learning pseudo-data used in the past learning as data for identifying the learning data. The learning pseudo-data input to the pseudo-data reinput unit 113 is one type of second past data.

The control unit 12 controls the entire learning device 1. The control unit 12 includes a processor such as a central processing unit (CPU) and a memory. The control unit 12 executes a program to implement functions of an extended data generation unit (combined data generator) 121, a feature extraction unit 122, an identification unit 123, a loss acquisition unit (loss acquirer) 124, a parameter updating unit (parameter updater) 125, and an end determination unit 126.

The extended data generation unit 121 generates extended data (combined data) by combining the learning input data $x^i k$ input by the data input unit 111 and the pseudo-data $\zeta_{k,c}$ input by the pseudo-data input unit 112. Specifically, the extended data generation unit 121 may generate the extended data by blending the learning input data $x^i k$ and the learning pseudo-data $\zeta_{k,c}$ at a ratio determined by a probability distribution function given in advance. The extended data generation unit 121 is one type of combined data generation unit.

The extended data generation unit 121 will be described by giving a specific example. As described above, an objective of the present invention is to keep storing the classes included in the preservation set $C^p_k$ (without accessing the original data set) while forgetting the classes included in the deletion set $-C^p_k$ (where – is above C). In order to achieve this objective, in the present invention, information regarding each class is associated with simple data called learning pseudo-data and whether to keep to store or forget the class is controlled using the learning pseudo-data.

More specifically, a special type of data extension is used to perform this control. An overview of this process is illustrated in FIG. 3. FIG. 3 is a diagram schematically illustrating a process according to the embodiment. When a new task (In FIG. 3, a new task) is received, the extended data generation unit 121 may generate one image having a random pixel value for each class as the class-specific learning pseudo-data $\zeta_{k,c}$ and embed the image in all samples of the corresponding class.

For example, extended data $\sim x^i_k$ (where ~ is above x) may be generated by combining the learning pseudo-data $\zeta_{k,c}$ with the original learning input data $x^i_k$ of a c-th class during the learning of the k-th task as in the following Expression (3).

[Math. 3]

$$\tilde{x}^i_k = \lambda x^i_k + (1 \rightarrow \lambda)\xi_{k,c} \qquad \text{Expression (3)}$$

In Expression (3), λ is a random value taken between 0 and 1. In addition to the original set $\{(x^i_k, y^i_k)\ N_{i=1}\}$, the extended data generation unit 121 stores a set $\{(\sim x^i_k, y^i_k)\ N_{i=1}\}$ including extended data $\sim x^i_k$ (where ~ is above x) in a memory (not illustrated). In subsequent processing, the parameter updating unit 125 updates parameters of the feature extraction unit 122 and the identification unit 123 using these two sets. When the updating ends, only the learning pseudo-data $\zeta_{k,c}$ may be left.

By learning using such extended data $\sim x^i_k$ (where ~ is above x), samples of the same class are aggregated around the corresponding learning pseudo-data $\zeta_{k,c}$ of a feature space. Therefore, it is possible to control whether to locally maintain a feature distribution around the learning pseudo-data $\zeta_{k,c}$ depending on whether the learning pseudo-data $\zeta_{k,c}$ is used at the time of learning of a new task. As a result, it is possible to memorize or forget any class using the learning pseudo-data $\zeta_{k,c}$ without using the learning input data $x^i_k$.

When the learning pseudo-data $\zeta_{k,c}$ is generated, a random color may be allocated to each grid of an image that has a random color pattern as illustrated in FIG. 3, that is, the same size as the learning input data $x^i_k$. Three advantage points obtained by using such random learning pseudo-data $\zeta_{k,c}$ are as follows.

The first advantage is that a random pattern is easily generated.

The second advantage is that the pattern is independent for each class or task.

The third advantage is that, unlike an existing memory-based approach in which some of the learning input data $x^i_k$ are used, a pattern itself does not directly express information regarding raw data. Therefore, that is appropriate for privacy protection and data leakage prevention.

The feature extraction unit 122 inputs the extended data generated by the extended data generation unit 121 and the learning pseudo-data reinput by the pseudo-data reinput unit 113 and extracts features. As a method of extracting features, for example, a network in general deep learning such as ResNet disclosed in Reference Literature 1 may be used.

(Reference Literature 1: K. He, X. Zhang, S. Ren, and J. Sun, "Deep Residual Learning for Image Recognition", In Proc. CVPR, 2016.)

The identification unit 123 identifies the input data using the features extracted by the feature extraction unit 122. As a method of performing identification from the features, for example, a final layer in a network in general deep learning such as ResNet disclosed in Non Patent Literature 4 may be used. Alternatively, as a method of performing identification from features, for example, a method such as a support vector machine may be used. Although the case in which the identification unit 123 in the embodiment estimates a specific class label has been described, the present invention is not limited thereto. For example, the identification unit 123 may perform the regression process instead of performing the identification process. Further, the case where a structure of the network in the identification unit 123 is a multi-head structure will be described, but the present invention is not limited thereto.

The loss acquisition unit 124 acquires a loss by using the learning data input by the data input unit 111, the learning pseudo-data input by the pseudo-data reinput unit 113, and a result identified by the identification unit 123. For example, the loss acquisition unit 124 may include regularization for restricting a range of the parameters updated by the parameter updating unit 125.

More specifically, an operation of the loss acquisition unit 124 will be described. The loss acquired by the loss acquisition unit 124 is acquired based on Expression (4). A total loss function L for learning expressed in Expression (4) may include four terms of a classification loss $L_C$, a pseudo-data loss $L_M$, a selective forgetting loss $L_F$, and a regularization term $L_R$.

[Math. 4]

$$L=L_C+L_M+L_F+L_R \quad \text{Expression (4)}$$

The terms of the classification loss $L_C$ and the pseudo-data loss $L_M$ are terms for memorizing a new task. The terms of the selective forgetting loss $L_F$ and the regularization term $L_R$ are terms for keeping a previous task. Hereinafter, these terms will be described in detail.

The classification loss $L_C$ is introduced to accurately perform classification on new tasks. Specifically, the classification loss $L_c$ may be given as in, for example, Expression (5).

[Math. 5]

$$L_C = \frac{1}{N_k}\sum_i l(x_k^i, y_k^i) \quad \text{Expression (5)}$$

In Expression (5), $N_k$ is the number of learning samples of a k-th task, and l(x, y) is a loss function of the learning input data $x^i_k$ and the learning reference data $y^i_k$ (for example, the class label y). For example, as the loss function, Softmax Cross Entropy (CE) or Addition Margin Softmax (AMS) loss may be used.

As the pseudo-data loss $L_M$, in addition to the classification loss $L_C$ in which the learning input data $x^i_k$ is used, another loss in which the extended data is used and the learning pseudo-data is used may be used in order to link each piece of learning pseudo-data to the corresponding class. The pseudo-data loss $L_M$ is expressed as in the following Expression (6).

[Math. 6]

$$L_M = \frac{1}{N_k}\sum_i l(\tilde{x}_k^i, y_k^i) \quad \text{Expression (6)}$$

As the loss function, a function similar to the classification loss $L_C$ may be used.

The selective forgetting loss $L_F$ is introduced to store only a class belonging to the preservation set $C^p{}_k$ and forgetting a class belonging to the deletion set $-C^p{}_k$ (where − is above C). Specifically, achievement is made by performing learning using only the learning pseudo-data corresponding to the class of the preservation set and discarding other learning pseudo-data (for example, the learning pseudo-data corresponding to the class of the deletion set). More specifically, when $\zeta^i{}_p$, is learning pseudo-data for generating $x^i{}_p$, a loss may be given in, for example, the following Expression (7).

[Math. 7]

$$L_{SF} = \gamma_{SF}\sum_p \frac{1}{N_p}\sum_i l(\xi_k^i, y_k^i) \quad \text{Expression (7)}$$

In Expression (7), $N_p$ is the number of learning samples in a p-th task, and $\gamma_{SF}$ is a weight for adjusting a strength of this loss. This loss function does not use any learning input data $x^i_k$. Then, since the learning pseudo-data of the classes in the deletion set $-C^p{}_k$ (where − is attacked on C) is not used, these classes result in catastrophic forgetting. As a result, it is possible to selectively forget the previous task without using the learning input data $x^i_k$ at all.

The regularization term $L_R$ may be a general regularization (For example, Non Patent Literature 3 and Reference Literatures 2 and 3) introduced to prevent catastrophic forgetting.

(Reference Literature 2: James Kirkpatrick, Razvan Pascanu, Neil Rabinowitz, Joel Veness, Guillaume Desjardins, Andrei A Rusu, Kieran Milan, John Quan, Tiago Ramalho, Agnieszka Grabska-Barwinska, et al, "Overcoming catastrophic forgetting in neural networks", PNAS, 114 (13): 3521-3526, 2017.)

(Reference Literature 3: Rahaf Aljundi, Francesca Babiloni, Mohamed Elhoseiny, Marcus Rohrbach, and Tinne Tuytelaars. "Memory Aware Synapses: Learning what (not) to forget", ECCV, pages 139-154, 2018.)

In the present embodiment, since it is necessary to prevent catastrophic forgetting only for the preservation set $C^p{}_k$ as a regularization term, only the preservation set may be corrected to provide regularization. More specifically, for example, in the case of Non Patent Literature 3, the following Expression (8) may be used as a regularization term.

[Math. 8]

$$L_{LWF+} = -\gamma \sum_{i \in C_k^P} y_o'^{(i)} \log \hat{y}_o'^{(i)} \quad \text{Expression (8)}$$

In Expression (8), γ is a weight of a term, and i is an index of a class label. Here, a sum is changed such that $i \in C^p_k$ is used only for the preservation set $C^p_k$. $y'_o{}^{(i)}$ and $\hat{}y'_o{}^{(i)}$ (where ^ is above y) in Expression (8) are terms obtained by correcting recorded probabilities and current probabilities corrected. In the case of Non Patent Literature 5, the following Expression (9) may be used as a regularization term.

[Math. 9]

$$L_{EWC+} = -\frac{\gamma}{2} \sum_{p,q} \Gamma_{p,q}(\theta_p - \hat{\theta}_{p,q}) \quad \text{Expression (9)}$$

In Expression (9), γ is a weight of the regularization term, and $\Gamma_{p,q}$ is a component of a Fisher matrix of a p-th previous task corresponding to a q-th parameter $\hat{}\theta_{p,q}$ (where ^ is above θ) on a diagonal line. The Fisher matrix may be changed so that only for the class corresponding to the preservation set $C^p_k$ is evaluated as in the foregoing expression. As the regularization term, a plurality of regularizations may be used in combination by a linear sum or the like.

The parameter updating unit 125 updates the machine learning model so that a loss acquired by the loss acquisition unit 124 decreases. Specifically, the updating of the machine learning model which is based on the loss is a process of updating a value of a parameter of a neural network representing the machine learning model according to a predetermined rule based on the loss. More specifically, the updating of the value of the parameter of the neural network is, for example, updating of the value of the parameter corresponding to each of the feature extraction unit 122 and the identification unit 123. When the parameter is updated, the parameter updating unit 125 may update the parameter using an existing method such as a stochastic gradient method.

The end determination unit 126 determines whether a predetermined end condition is satisfied. The predetermined end condition may be set in advance. For example, the predetermined end condition may be a condition that the loss has decreases by a threshold value or more, or that the parameter has been updated a predetermined number of times.

The communication unit 13 includes a communication interface for connecting the learning device 1 to an external device. The communication unit 13 communicates with the external device in a wired or wireless manner. The external device is, for example, a device that is a transmission source of the learning data.

The storage unit 14 is configured using a non-transitory computer-readable storage medium device such as a magnetic hard disk device or a semiconductor storage device. The storage unit 14 stores various types of information regarding the learning device 1. The storage unit 14 stores, for example, information input via the input unit 11 or the communication unit 13. The storage unit 14 stores, for example, a machine learning model. The storage unit 14 stores, for example, various types of information generated by executing the machine learning model.

The learning data and the learning pseudo-data are not necessarily required to be input only to the input unit 11, and are not necessarily required to be input only to the communication unit 13. The learning data and the learning pseudo-data may be input from either the input unit 11 or the communication unit 13. For example, the learning data may be input to the input unit 11, and the learning pseudo-data may be input to the communication unit 13. The learning data and the learning pseudo-data may be stored in the storage unit 14 in advance.

The output unit 15 outputs various types of information. The output unit 15 is configured to include, for example, a display device such as a cathode ray tube (CRT) display, a liquid crystal display, or an organic electro-luminescence (EL) display. The output unit 15 may be configured as an interface connecting such a display device to the learning device 1. The output unit 15 outputs, for example, information input to the input unit 11. The output unit 15 may display, for example, the learning data input to the input unit 11 or the communication unit 13. The output unit 15 may display, for example, an execution result of the machine learning model.

Figure 4:
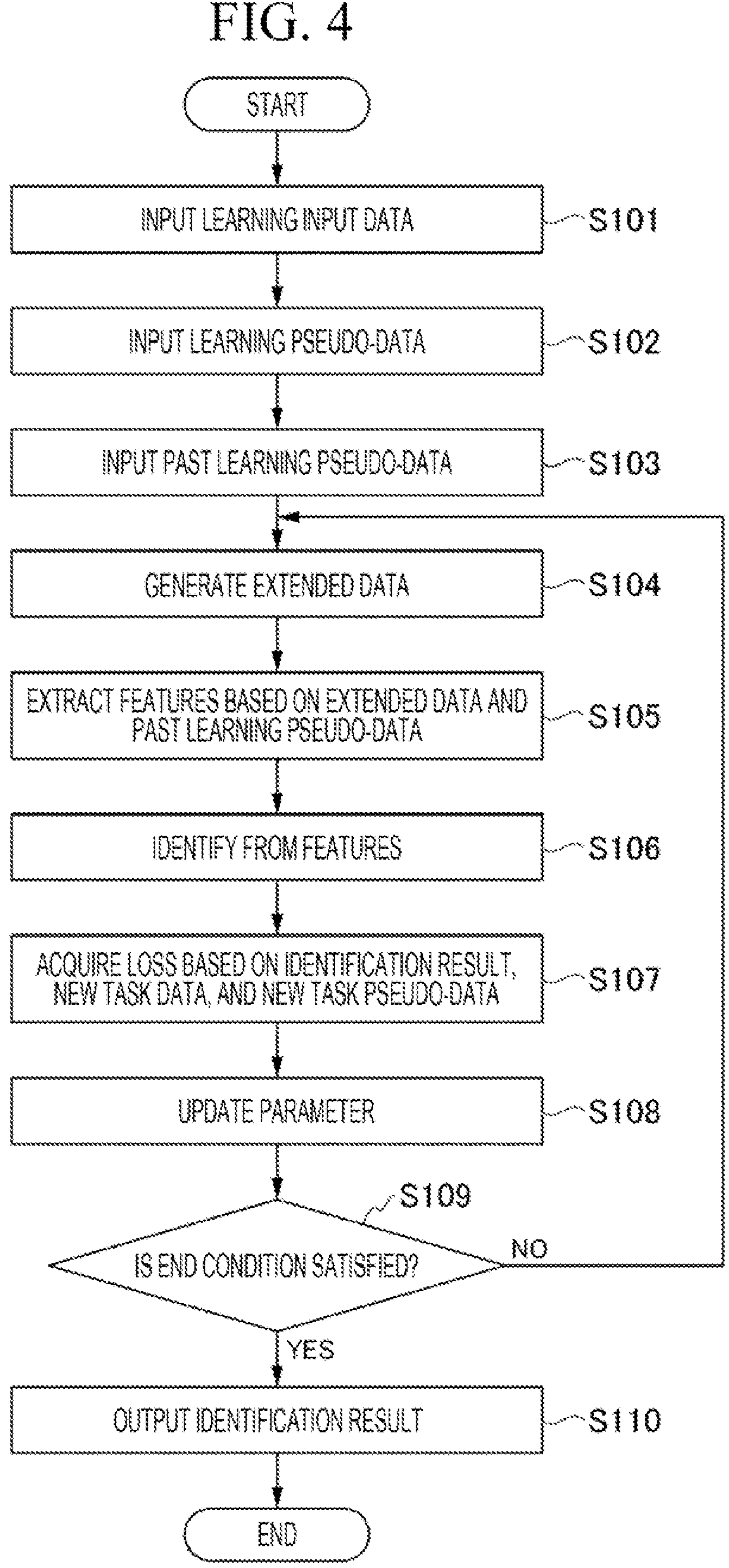
FIG. 4 is a flowchart illustrating a flow of a learning process of the learning device according to the embodiment.

FIG. 4 is a flowchart illustrating a flow of a learning process in the learning device 1 according to the embodiment.

The data input unit 111 inputs learning input data of a new task (step S101). The data input unit 111 outputs the input learning input data to the control unit 12. The pseudo-data input unit 112 inputs the learning pseudo-data corresponding to the new task (step S102). The pseudo-data input unit 112 outputs the input learning pseudo-data to the control unit 12. The pseudo-data reinput unit 113 inputs the learning pseudo-data corresponding to the past task (step S103). The pseudo-data reinput unit 113 outputs the input learning pseudo-data to the control unit 12.

The extended data generation unit 121 acquires the learning input data and the learning pseudo-data output from the pseudo-data input unit 112. The extended data generation unit 121 generates extended data by combining the acquired learning input data and learning pseudo-data (step S104). The extended data generation unit 121 outputs the generated extended data to the feature extraction unit 122.

The feature extraction unit 122 extracts the features using the extended data output from the extended data generation unit 121 and the learning pseudo-data corresponding to the past task output from the pseudo-data reinput unit 113 (step S105). The identification unit 123 performs identification from the features extracted by the feature extraction unit 122 (step S106). The loss acquisition unit 124 acquires a loss based on the identification result obtained by the identification unit 123, the learning input data output from the data input unit 111, and the learning pseudo-data corresponding to the past task output from the pseudo-data reinput unit 113 (step S107). For example, the loss acquisition unit 124 acquires a loss by the foregoing Expression (4).

The parameter updating unit 125 updates the parameters of the machine learning model based on the loss acquired by the loss acquisition unit 124 (step S108). The end determination unit 126 determines whether the end condition is satisfied (step S109). When the end condition is not satisfied (NO in step S109), the learning device 1 executes the process of step S104 and subsequent steps.

Conversely, when the end condition is satisfied (YES in step S109), the data output unit 30 outputs the identification result of the identification unit 123 (step S110).

Next, the superiority of the technology according to the present invention will be described with reference to FIG. 5.

Figure 5:
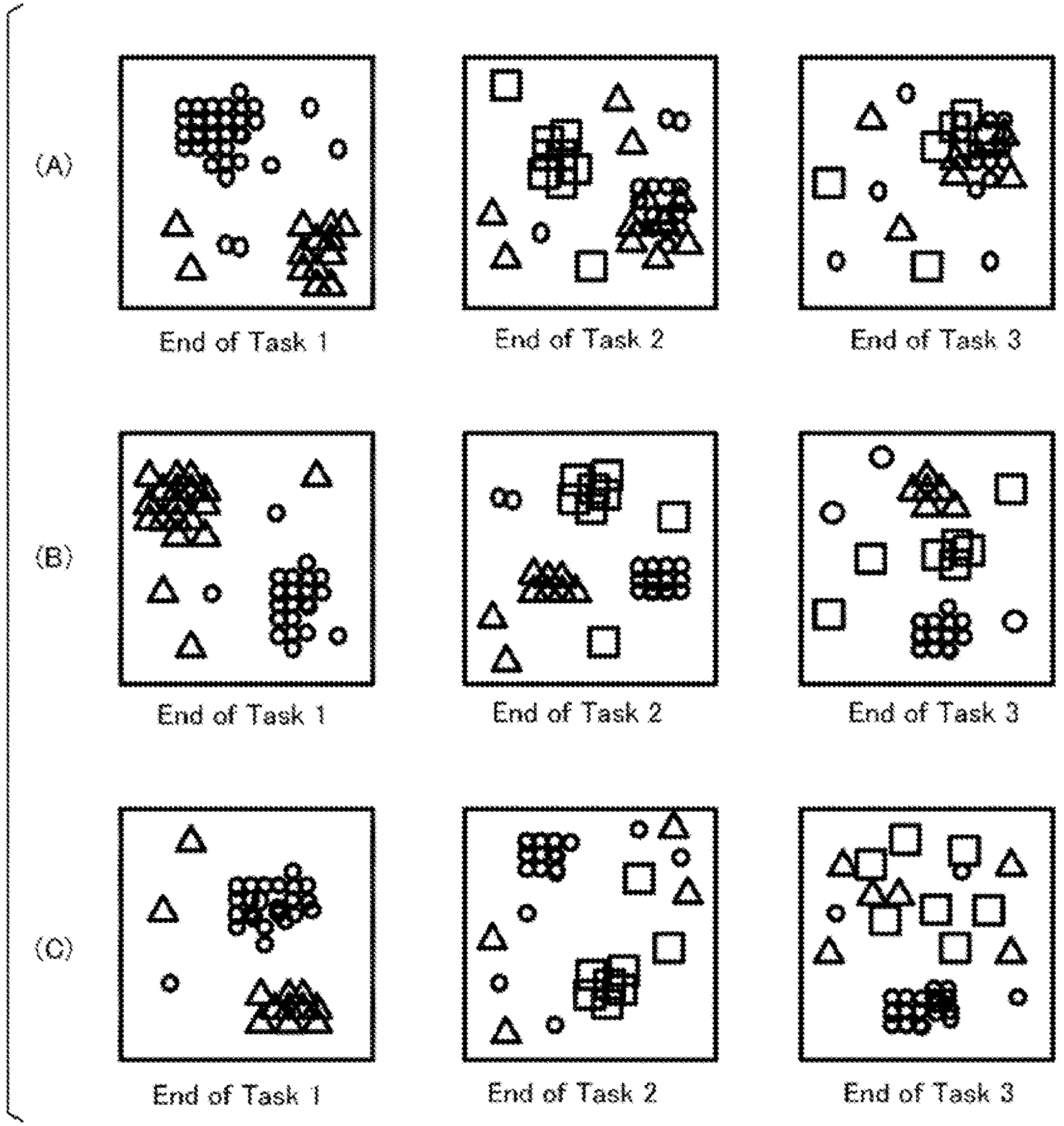
FIG. 5 is a diagram illustrating superiority of the present invention.

In FIG. 5, features on the last layer of a shared backbone at the end of each task are visualized using, for example, t-stochastic neighbor embedding (SNE). (A) of FIG. 5 is a diagram visualizing features on the final layer when only the classification loss LC is used. (B) of FIG. 5 is a diagram visualizing features on the final layer when a general lifelong learning method is used. (C) of FIG. 5 is a diagram visualizing features on the final layer when the scheme in the present invention is used.

When only the classification loss is used, all the past tasks are forgotten. This is because all the samples of the past tasks are randomly arranged as illustrated in (A) of FIG. 5.

When general lifelong learning is used, as illustrated in (B) of FIG. 5, samples are aggregated for each class in all the past tasks, and a structure in which the samples can be easily separated for each class is obtained. That is, this means that while lifelong learning is possible, a specific class cannot be forgotten.

In contrast to the foregoing two cases, when the scheme according to the present invention is used, as illustrated in (C) of FIG. 5, samples of classes to be stored remain aggregated in a feature space, and the classes to be stored can be quickly dissipated. Thus, as illustrated, it is possible to perform lifelong learning while forgetting only a class required to be forgotten.

Figure 6:
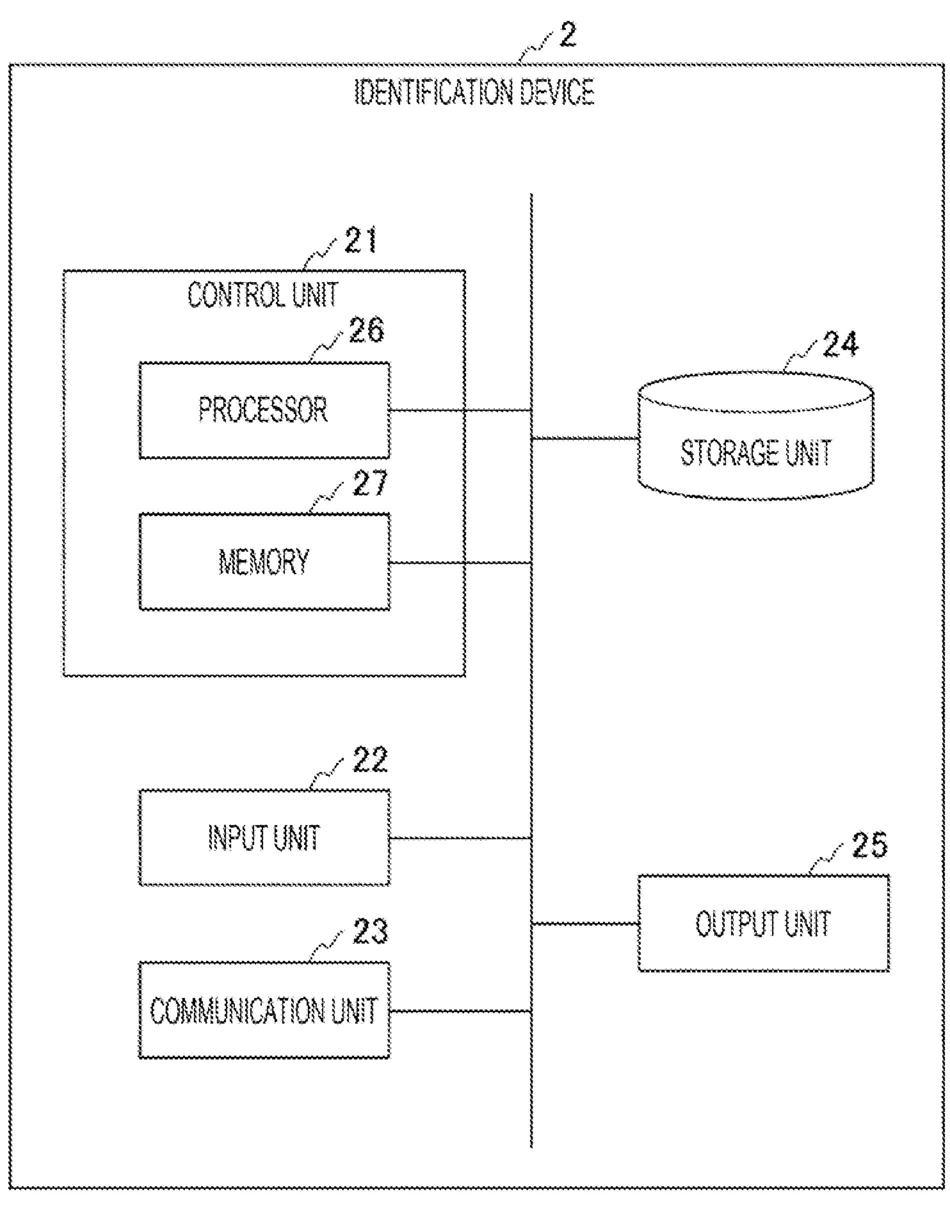
FIG. 6 is a diagram illustrating an example of a hardware configuration of an identification device according to the embodiment.

FIG. 6 is a diagram illustrating an example of a hardware configuration of the identification device 2 according to the embodiment. The identification device 2 performs an identification process using the learned model obtained by the learning device 1. The identification device 2 includes a control unit 21 including a processor 26 such as a CPU and a memory 27 connected by a bus, and executes a program. The identification device 2 functions as a device that includes a control unit 21, an input unit 22, a communication unit 23, a storage unit 24, and an output unit 25 by executing a program.

More specifically, the processor 26 reads the program stored in the storage unit 24, and stores the read program in the memory 27. When the processor 26 executes the program stored in the memory 27, the identification device 2 functions as a device that includes the control unit 21, the input unit 22, the communication unit 23, the storage unit 24, and the output unit 25.

The control unit 21 controls operations of various functional units included in the identification device 2. The control unit 21 identifies the input data using, for example, the learned model obtained by the learning device 1. Specifically, the control unit 21 identifies the data by inputting the data input to the identification device 2 to the learned model. For example, the control unit 21 performs data classification.

The input unit 22 includes an input device such as a mouse, a keyboard, or a touch panel. The input unit 22 may be configured as an interface that connects such an input device to the own device. The input unit 22 receives inputs of various types of information to the own device. The input unit 22 receives, for example, an input for giving an instruction to start a process. The input unit 22 receives, for example, an input of data which is a processing target.

The communication unit 23 includes a communication interface connecting the own device to an external device. The communication unit 23 communicates with an external device in a wired or wireless manner. The external device with which the communication unit 23 communicates is, for example, an output destination of processed data. In this case, the communication unit 23 outputs the processed data to the external device through communication with the external device.

The communication unit 23 may communicate with, for example, the learning device 1. In this case, the communication unit 23 acquires, for example, a learned model obtained by the learning device 1.

The storage unit 24 is configured using a non-transitory computer-readable storage medium device such as a magnetic hard disk device or a semiconductor storage device. The storage unit 24 stores various types of information regarding the identification device 2. The storage unit 24 stores, for example, the learned model acquired via the communication unit 23. The storage unit 24 stores, for example, data which is a processing target input to the input unit 22.

The output unit 25 outputs various types of information. The output unit 25 includes, for example, a display device such as a CRT display, a liquid crystal display, or an organic EL display. The output unit 25 may be configured as an interface that connects such a display device to the own device. The output unit 25 outputs, for example, information input to the input unit 22.

The learning device 1 that has the foregoing configuration can perform learning capable of storing other knowledge while selectively forgetting unnecessary knowledge among past tasks. This is because when the model (that is, the feature extraction unit and the identification unit) is updated, the extended data generation unit 121 performs data extension to embed a task-specific signal called pseudo input data, for example, in all the input data of the corresponding class. Then, when the new task is learned, the learning device 1 ignores (does not use) the learning pseudo-data of the class to be deleted. This is because the class to be deleted can be intentionally forgotten. This is because selective forgetting of the previous task can be realized.

The learning device 1 may be mounted by using a plurality of information processing devices communicably connected via a network. In this case, each functional unit included in the learning device 1 may be mounted in a distributed manner in a plurality of information processing devices.

All or some of the functions of the learning device 1 and the identification device 2 may be implemented by hardware (a circuit unit including circuitry) such as an application specific integrated circuit (ASIC), a programmable logic device (PLD), or a field programmable gate array (FPGA) The program may be recorded on a computer-readable recording medium. The "computer-readable recording medium" refers to, for example, a portable medium such as a flexible disk, a magneto-optical disc, a read-only memory (ROM), or a compact disc read-only memory (CD-ROM), or a storage device such as a hard disk embedded in a computer system. The program may be transmitted via an electrical communication line.

Although embodiments of the present invention have been described in detail with reference to the drawings above, specific configurations are not limited to these embodiments and include designs without departing from the gist of the present invention.

INDUSTRIAL APPLICABILITY

The present invention can be applied to lifelong learning.

REFERENCE SIGNS LIST

1 Learning device
2 Identification device
11 Input unit
12 Control unit
13 Communication unit
14 Storage unit
15 Output unit
21 Control unit
22 Input unit
23 Communication unit
24 Storage unit
25 Output unit
26 Processor
27 Memory
111 Data input unit
112 Pseudo-data input unit
113 Pseudo-data reinput unit
121 Extended data generation unit
122 Feature extraction unit
123 Identification unit
124 Loss acquisition unit
125 Parameter updating unit
126 End determination unit

The invention claimed is:

1. A learning device comprising:

a data inputter configured to receive first data which is a learning target, second data for identifying the first data, and second past data that is used as data for identifying the first data during past learning and relates to learning content to be preserved;

a combined data generator configured to generate combined data by combining the first data and the second data; and a parameter updater configured to update a parameter of a machine learning model based on features of the second past data and the combined data obtained by inputting the combined data and the second past data to the machine learning model.

2. The learning device according to claim 1, wherein the second data is one of data of a random noise pattern, data of a pattern in which a part of learning input data is changed, or data of a pattern represented by an average value of the learning input data.

3. The learning device according to claim 1, further comprising:

an identificator configured to identify the first data using features of the combined data and the second past data; and a loss acquirer configured to acquire a loss using the first data, the second past data, and an identification result of the identificator.

4. The learning device according to claim 3, wherein the loss acquirer acquires the loss based on regularization for restricting a range of a parameter updated by the parameter updater, a loss which is based on identification accuracy in the combined data, a loss which is based on identification accuracy in the first data, and a loss which is based on identification accuracy in the second data.

5. A learning method comprising:

receiving first data which is a learning target, second data for identifying the first data, and second past data that is used as data for identifying the first data during past learning and relates to learning content to be preserved;

generating combined data by combining the first data and the second data; and updating a parameter of a machine learning model based on features of the second past data and the combined data obtained by inputting the combined data and the second past data to the machine learning model.

6. A non-transitory computer readable storage medium that stores a computer program to be executed by the computer;

receiving first data which is a learning target, second data for identifying the first data, and second past data that is used as data for identifying the first data during past learning and relates to learning content to be preserved;

generating combined data by combining the first data and the second data; and updating a parameter of a machine learning model based on features of the second past data and the combined data obtained by inputting the combined data and the second past data to the machine learning model.

* * * * *